Nov. 18, 1930.   A. R. SCHOULTZ   1,782,319
RADIATOR TRAP

Filed May 3, 1929

Albert Schoultz INVENTOR
BY Victor J. Evans
HIS ATTORNEY

Patented Nov. 18, 1930

1,782,319

UNITED STATES PATENT OFFICE

ALBERT R. SCHOULTZ, OF JOLIET, ILLINOIS

RADIATOR TRAP

Application filed May 3, 1929. Serial No. 360,206.

This invention relates to certain novel improvements in radiator traps and particularly relates to such traps as are associated with radiators employed with steam heating apparatus and has for its principal object the provision of an improved construction of this character which will be highly efficient in use and economical in manufacture.

It is among the objects of my invention to provide a radiator trap which will be particularly adapted for use in connection with a so called two pipe steam heating system and my improved trap is intended to be associated with the outlet end of a radiator so as to permit water escapement but to prevent steam escapement.

Another object of my invention is to provide a trap of the above named character which will be arranged in a manner such that a siphoning action will take place so as to withdraw water entrapped in the device.

Another object of the invention is to provide a device of the above named character which will be constructed in a manner such that access may be readily attained to the interior thereof so as to facilitate cleaning.

Other objects will appear hereinafter.

The invention consists in the novel combination and arrangement of parts to be hereinafter described and claimed.

The invention will be best understood by reference to the accompanying drawing, showing the preferred form of construction and in which.

Figure 1:
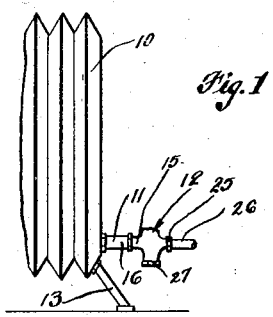
Fig. 1 is a fragmental side elevational view of a steam radiator showing my improved trap associated therewith.
Figure 2:
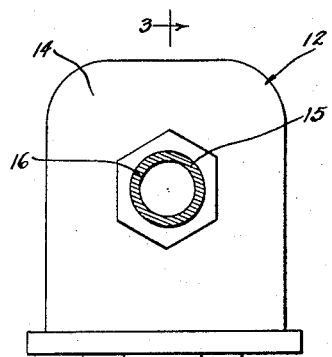
Fig. 2 is a view looking in at the right hand side of the trap as illustrated in Fig. 1.
Figure 3:
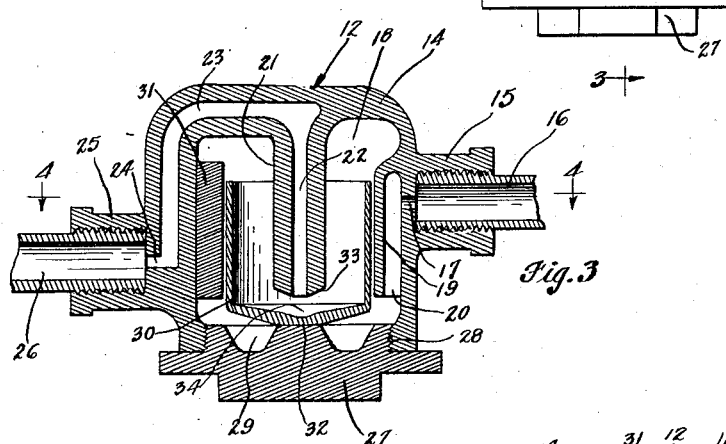
Fig. 3 is a sectional view taken substantially on the line 3—3 on Fig. 2.
Figure 4:
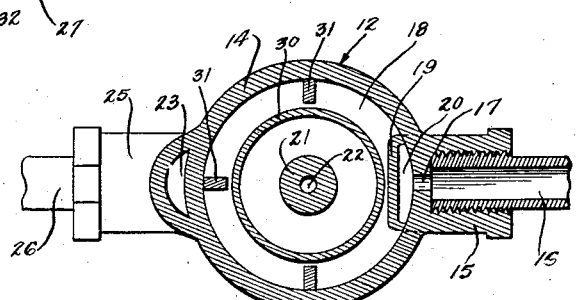
Fig. 4 is a sectional view taken substantially on the line 4—4 on Fig. 3.

In the accompanying drawing wherein I have illustrated the preferred form of construction for my invention 10 generically indicates a radiator of the type usually employed in connection with steam heating arrangements and this radiator includes an outlet pipe 11 in which my improved trap which is generically indicated by 12 is arranged. The radiator in the present instance is supported in spaced relation with the floor by the usual leg construction 13.

My improved trap includes a main housing 14 which has a boss 15 extending from one side thereof in which the inlet pipe 16 is arranged. A port 17 is provided in one of the side walls of the body 14 in alignment with the inlet pipe 16. A hollow chamber 18 is provided interiorly of the housing 14 and in this hollow chamber over the wall thereof embodying the inlet opening 17 there is provided a web 19 which is connected to the wall of the housing 14 in the manner such that an outlet opening 20 is defined at the lower end.

Projecting into the chamber 18 centrally thereof from the upper wall of the housing 14 is a boss 21 which has a passage 22 extending therethrough that communicates with a passage 23 formed in the top and side walls of the housing 14. The passage 23 terminates in an outlet opening 24 which is arranged in alignment with a boss 25 in which the outlet pipe 26 is screw threadedly fitted.

The lower end of the housing 14 is arranged to provide an opening which is closed by a cap 27 that is screw threadedly connected to the lower end of the housing 14 as indicated at 28. An opening 29 is provided in the inner face of the cap 27 in which sediment may collect.

A float 30 in the form of a cup is arranged in the housing 18 around the boss 21 and is maintained in a central position by ribs 31 and the web 19. A seat 32 is provided on the inner face of the cap 27 on which the float 30 normally rests. The lower end of the boss 21 is tapered as indicated at 33 and a valve seat 34 is defined on the inner surface of the lower wall of the float 30 which is employed in a manner now to be set forth.

The operation of the device is as follows. The water of condensation from the steam in the radiator 10 will flow through the pipe 16 and the inlet opening 17 down through the area behind the web 19 and out through the opening 20. This water will then collect above the cap 27 and will float the float 30 and said float will move upwardly until the valve seat 34 thereon engages the tapered portion 33 which will prevent passage out through the passage 22. The water which will continue to flow into the chamber 18 will then raise around the cup-shaped float 30 until the upper edge thereof is reached at which time it will flow into the cup and when a predetermined amount of water has passed thereinto the cup-shaped float 30 will fall back upon the seat 32 and, therefore, the water contained therein will begin to rise in the passage 22. As soon as the water passage 22 begins to flow through the passage 23 a siphoning effect will take place which will draw water from the float 30 and when the water has been withdrawn therefrom so that the quantity therein is reduced it is apparent that the water surrounding this cup-shaped float will again cause the same to float which will reengage the seat 34 with the tapered portion 33 which will prevent passage through the passage 22 and thus interrupt the siphoning action and the hereinbefore described cycle of operation will again be repeated. It is apparent from the foregoing description that a very effective water seal is established which will prevent steam escapement but the arrangement is such that entrapped water will be very effectively discharged.

It is apparent from the foregoing description that the device is arranged in a manner which will very effectively carry out its purpose. Further, since the cap 27 is arranged at the lower end of the device it is apparent that the cleaning thereof is facilitated.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

In a device of the class described, a housing providing a chamber interiorly thereof, a boss on said housing projecting downwardly into said chamber from the upper end thereof, said boss having a tapered end portion terminating in spaced relationship with the lower end of said chamber and having an outlet passage extending therethrough, means including a web portion providing an inlet passage terminating in spaced relationship to the lower end of said chamber, a substantially cup-shaped float having the upper end thereof open and including a body portion disposed around said boss and having the walls thereof disposed intermediate said inlet and outlet passages, said float including a tapered bottom portion, ribs extending inwardly from the wall of said housing and adapted with said web portion to guide said float in the vertical movement thereof, a removable cap at the lower end of said housing and including an upwardly extending boss providing a seat for said float, said cap having an annular groove formed on the inner wall thereof adapted to collect sediment, whereby water of condensation entering said inlet passage will raise said float until the tapered bottom portion thereof engages the tapered end portion of said boss to prevent said water escaping through said outlet passage, and when the water in said chamber reaches the height of said float said float will be lowered onto said seat thereby causing a siphoning action in said outlet passage and permitting water to flow from said cup therethrough.

In testimony whereof I affix my signature.
ALBERT R. SCHOULTZ.